United States Patent [19]

Shibasaki

[11] Patent Number: 4,679,082
[45] Date of Patent: Jul. 7, 1987

[54] CODE TRANSMISSION SYSTEM CHARACTER BROADCASTING RECEIVER

[75] Inventor: Takeshi Shibasaki, Itami, Japan

[73] Assignee: Mitsubishi Denki Kabushiki Kaisha, Tokyo, Japan

[21] Appl. No.: 726,520

[22] Filed: Apr. 24, 1985

[30] Foreign Application Priority Data

Apr. 27, 1984 [JP] Japan .................. 59-86826

[51] Int. Cl.[4] ................ H04N 7/04; G06F 11/00
[52] U.S. Cl. .................. 358/147; 371/47
[58] Field of Search ........... 358/139, 142, 145–147; 371/42, 47, 61

[56] References Cited

U.S. PATENT DOCUMENTS 4,461,002 7/1984 Nanko ................... 358/147
4,479,146 10/1984 Cohn ................... 358/147

Primary Examiner—Jin F. Ng
Attorney, Agent, or Firm—Birch, Stewart, Kolasch & Birch

[57] ABSTRACT

A receiver for receiving a code transmission system character broadcasting signal transmitted during the vertical blanking period of television video signal, including: a circuit for extracting a character signal inserted in the video signal; a circuit for detecting the existence or non-existence of a code error in the character signal during the horizontal scanning period in which the character signal is inserted and outputting a detection signal; a buffer memory for temporarily storing the character signal accompanied by the detection signal; and a circuit for correcting the code error in a character signal read out from the buffer memory.

2 Claims, 4 Drawing Figures

CODE TRANSMISSION SYSTEM CHARACTER BROADCASTING RECEIVER

FIELD OF THE INVENTION

The present invention relates to a receiver for a code transmission system character broadcasting signal transmitted during the vertical blanking period of a television video signal.

BACKGROUND OF THE INVENTION

Recently, a code transmission character broadcasting system has been planned as a type of television broadcasting in which characters such as pertaining to the weather forecast or news are broadcast to be displayed on a CRT. In such a character broadcasting system, the character information is transmitted during the vertical blanking period of a video signal as digital data. At the receiver's side these character information data are temporarily stored in a memory of a receiver, and these are converted into signals capable of being displayed on a CRT by a decoder or the like, and are displayed on the same.

OBJECTS AND SUMMARY OF THE INVENTION

An object of the present invention is to provide a receiver for a code transmission system character broadcasting signal transmitted during the vertical blanking period of a television video signal.

Another object of the present invention is to provide a character broadcasting receiver which is capable of processing the character signals inserted in successive horizontal scanning periods.

Another object of the present invention is to provide a character broadcasting receiver which is capable of judging the existence of a code error in each character signal only by retrieving the detection data.

A further object of the present invention is to provide a character broadcasting receiver which is capable of efficiently outputting only essential character signals.

Other objects and advantages of the present invention will become apparent from the detailed description given hereinafter. It should be understood, however, that the detailed description and specific embodiment are given by way of illustration only, since various changes and modifications within the spirit and scope of the invention will become apparent to those skilled in the art from this detailed description.

According to the present invention, there is provided a receiver for a code transmission system character broadcasting signal, which comprises: a circuit for extracting a character signal inserted in the video signal; means for detecting the existence of a code error in the character signal during the horizontal scanning period in which the character signal is inserted and outputting a detection signal corresponding thereto; a buffer memory for storing the character signal accompanied by the detection signal; and means for correcting the code error in the character signal read out from the buffer memory.

DETAILED DESCRIPTION OF THE PREFERRED EMBODIMENTS

Figure 1:
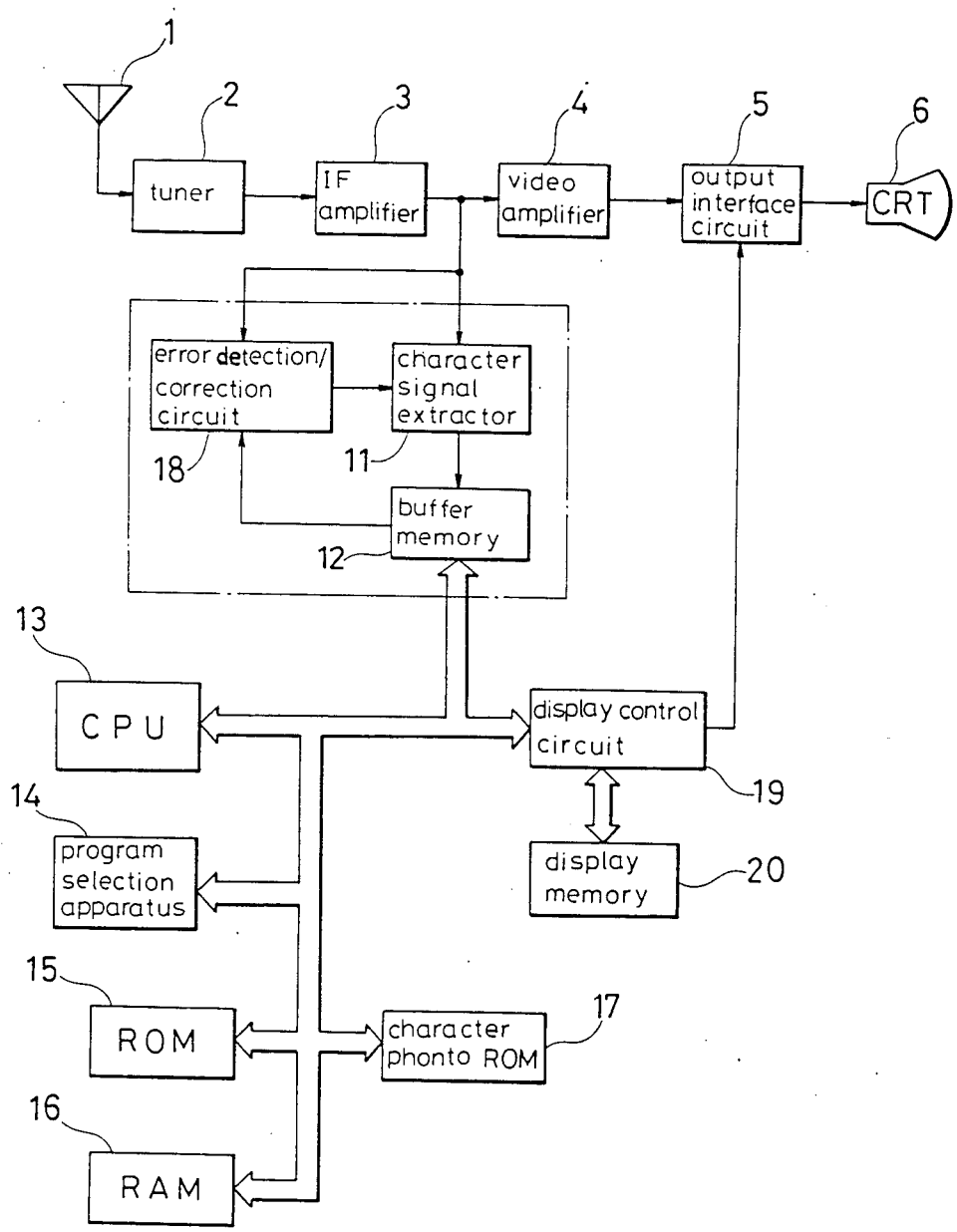
FIG. 1 is a schematic diagram of one embodiment of, a receiver for receiving a code transmission system character broadcasting signal according to the present invention.

In order to explain an embodiment of the present invention, reference will be more particularly made to FIG. 1:

The reference numeral 1 designates an antenna, the numeral 2 designates a tuner, the numeral 3 designates an intermediate frequency (hereinafter referred to as "IF") amplifier intended to detect the video signal obtained by the tuner 2. The numeral 11 designates a circuit for extracting a character signal from the video signal. The numeral 18 designates a circuit of a code error in the character signal at the time the character is extracted. The numeral 12 designates a buffer memory for temporarily storing the character signal obtained by adding the detection signal from the circuit 18 to the output of the character signal extracting circuit 11. The error detection circuit 18 also functions to correct a code error in the character signal at a different time from that of error detection.

The numeral 13 designates a central processing unit (hereinafter referred to as "CPU") intended to interpreting the character signal in the buffer memory 12 as well as to control the whole system of this receiver. The numeral 19 designates a display control circuit for controlling the display of the character signal by an instruction from the CPU 13. The numeral 20 designates a display memory for storing the interpreted character signal. The numeral 14 designates a program selection apparatus. The numeral 15 designates a programmable ROM for the CPU 13. The numeral 16 designates a work RAM. The numeral 17 designates a character phonto ROM used for decoding the character signal to generate a character or a figure.

Furthermore, the numeral 4 designates a video amplifier intended to amplify the output of the IF amplifier 3. The numeral 5 designates an output interface circuit which switches to display either the video signal from the video amplifier 4 or the character signal read out from the display memory 20 through the display control circuit 19 on the CRT 6 as well as conducting level switching.

Figure 2:
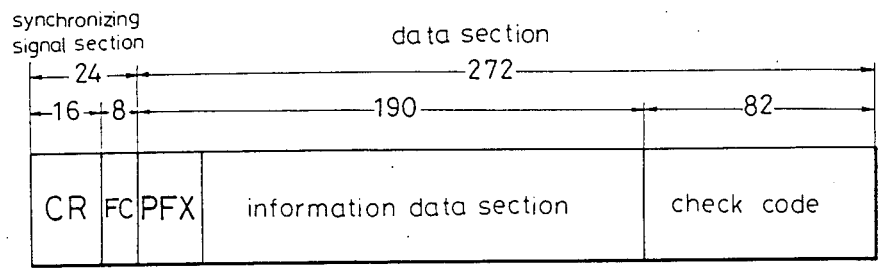
FIG. 2 is a diagram showing a construction of a character signal inserted in the video signal.

FIG. 2 shows a construction of a data packet for the character signal. The synchronizing signal section is constituted by a clock-run-in CR of 16 bits at the head of the data packet, and a framing code FC of 8 bits following the clock-run-in CR, both of which are in a special code construction. The data section is constituted by a prefix PFX and an information data section totally amounting to 190 bits, and a check code of 82 bits. The check code of 82 bits is an error correction code of a transmission level for correcting errors in the data section of 190 bits including the prefix PFX.

Figure 3:
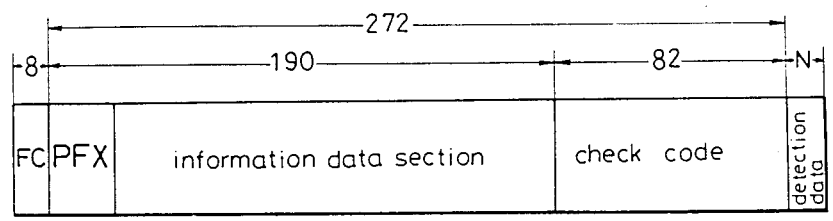
FIG. 3 is a diagram showing a construction of a character signal to which the character extraction and error detection are executed.

FIG. 3 shows a construction of a data packet to which the extraction of a character signal is executed. This is a construction of data temporarily stored in the buffer memory 12 after processing by the character signal extracting circuit 11 and the error detection/correction circuit 18. This data packet is constituted by the data section of 190 bits including the prefix PFX, the check code of 82 bits, and a detection code of N bits for indicating the existence of a code error in the data packet. The N bit detection data is added to the data packet after the detection of the existence of a code error is conducted in the horizontal scanning period (from No. 10H to No. 16H, No. 21H, No. 273H to No. 279H or No. 284H) where the data packet is inserted at the same time as the extraction of the character signal.

Figure 4:
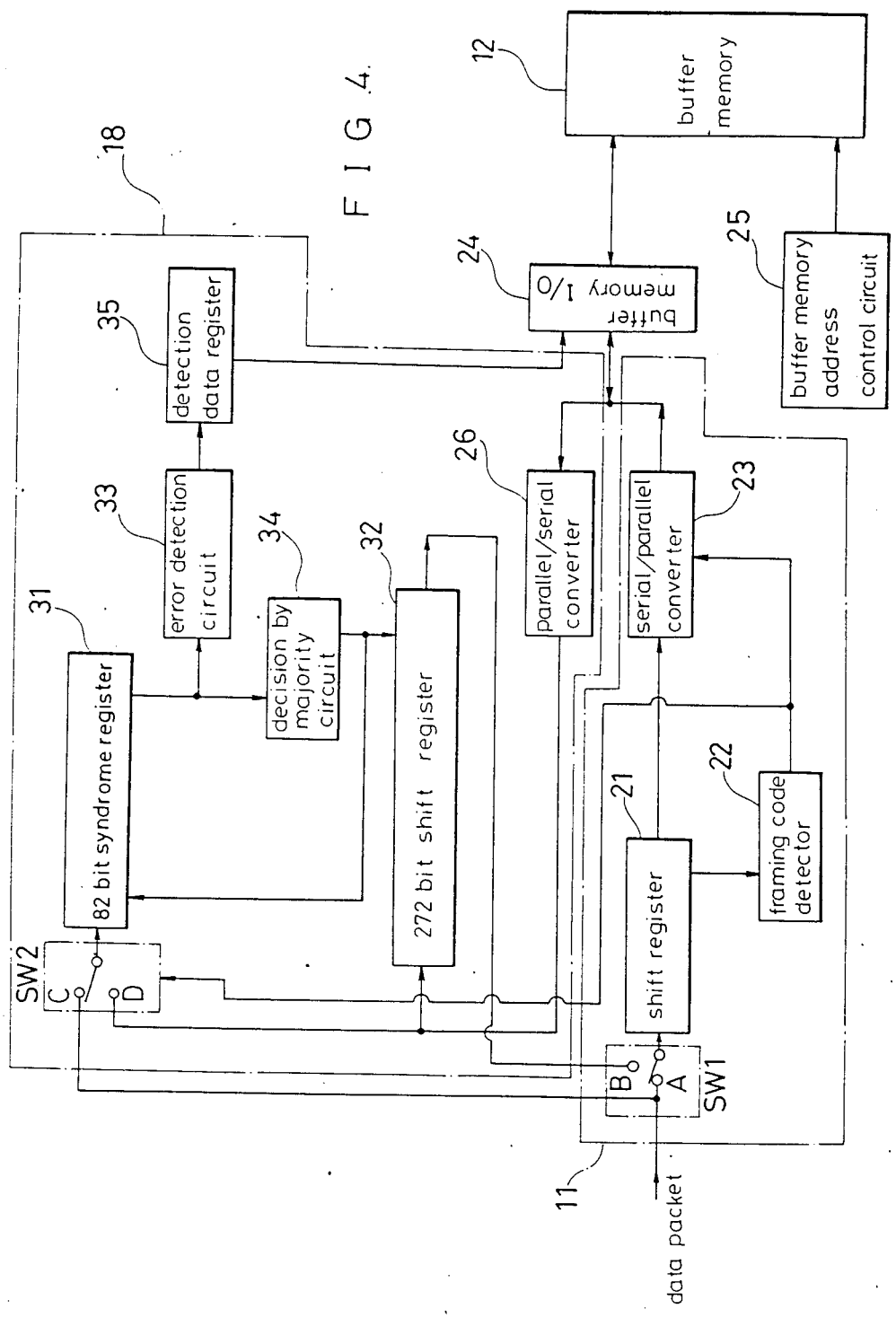
FIG. 4 is a diagram showing a construction of the main portion of the device of FIG. 1.

FIG. 4 shows an example of the circuit construction surrounded by dotted lines in FIG. 1, including the character signal extracting circuit 11, the error detection/correction circuit 18, and the buffer memory 12.

The character signal extracting circuit 11 is constituted by a first switch SW1, a shift register 21, a framing code detector 22, and a serial/parallel converter 23. The error detection/correction circuit 18 is constituted by a second switch SW2, an 82 bit syndrome register 31, a 272 bit shift register 32, an error detection circuit 33, a decision by majority circuit 34, a detection data register 35, and a parallel/serial converter 26. The numeral 24 designates a buffer memory I/O, and the numeral 25 designates a buffer memory address control circuit.

The operation of this device is now briefly described with reference to FIG. 1.

The character signal is transmitted during the vertical blanking period of the television signal. The television video signal is received by the antenna 1 and the tuner 2, and amplified by the IF amplifier 3. The character signal extracting circuit 11 extracts the character signal from the detected video signal. At the same time, the existence of a code error is detected by the error detection/correction circuit 18, and the signal (refer to FIG. 3) obtained by adding the detection data (N bit data) to the character signal is temporarily stored in the buffer memory 12.

The character signal stored in the buffer memory 12 is subjected to a code error correction in the error detection/correction circuit 18, and stored in the buffer memory 12 again. The corrected character signal is decoded by the CPU 13, and stored in the display memory 20 through the display control circuit 19. The video signal from the video amplifier 4 or the character signal read out from the display memory 20, selected by the output interface circuit 5, is displayed on the CRT 6.

The operation of the character signal extraction and the error detection and correction will now be described with reference to FIGS. 2 to 4.

In the character signal extraction and error detection, the switch SW1 is connected to the terminal A, and the data packet shown in FIG. 2 is input to the shift register 21. The framing code FC is detected by the framing code detector 22, the data in the shift register 21 beginning from the framing code FC is converted from serial to parallel by the serial/parallel converter 23, and is stored in the buffer memory 12 through the buffer memory I/O 24.

The detection of a code error is conducted concurrently with the extraction of the character signal; that is, the switch SW2 is connected to the terminal C after the framing code FC is detected by the FC detector 22. Therefore, the data of 272 bits starting from the prefix PFX is input to the 82 bit syndrome register 31. When at least one of the contents of the 82 bit syndrome register 31 are "1", a code error exists and the existence of this code error is detected by the error detection circuit 33. This detection result is output from the detection data register 35 as N bit data, and is stored in the buffer memory 12 through the buffer memory I/O 24.

In this way, the data packet inserted in the video signal is stored in the buffer memory 12 in real time, and has a construction shown in FIG. 3.

The operation of error correction is now described.

The CPU 13 retrieves the N bit detection data in the data packet stored in the buffer memory 12, and judges whether an error exists in the data packet. When no error exists, the code is immediately decoded. When an error exists, the switch SW2 is switched to the terminal D to operate the 82 bit syndrome register 31 and the 272 bit shift register 32, whereby the data packet including an error is read out from the buffer memory 12 to the registers 31 and 32 through the buffer memory I/O 24 and the parallel/serial converter 26, and is subjected to an error correction. Then, it is detected in which bit a code error exists-by-the decision by majority circuit 34, and the code error is corrected.

The principle of the error correction is based on the face that the (272, 190) decision by majority code of the information data is dividable by the generation polynominal G(X) if there is no code error upon reception. Hereupon, the generation polynominal G(X) is represented by the following formula:

$$G(X) = X^{82} + X^{77} + X^{76} + X^{71} + X^{67} + X^{66} + X^{56} +$$
$$X^{52} + X^{48} + X^{40} + X^{36} + X^{34} + X^{24} + X^{22} +$$
$$X^{18} + X^{10} + X^4 + 1$$

Where, the check codes $X^{81}, X^{80}, \ldots, X^1, X^0$ are remainders obtained by dividing the information bits $X^{271}$, $X^{270}, \ldots, X^{83}, X^{82}$ by the above-described generation polynominal G(X). Accordingly, the remainder obtained by dividing the information data to 190 bits by the generation polynominal G(X) becomes the check code of 82 bits for error correction. The data packet transmitted from the transmitter's side is constituted by the information data and the check code, and at the receiver's side the error correction is conducted-by-the decision by majority circuit using the information data of 190 bits and check code of 82 bits.

The corrected data is stored again in the buffer memory 12 through the switch SW1 switched to the terminal B and the shift register 21 in the same manner as in the aforementioned extraction. When the correction is completed the contents of the 82 bit syndrome register 31 become all "0".

As evident from the foregoing, only the detection of existence of an error is conducted at the same time as the extraction of the character signal while storing data in the buffer memory 12, thereby enabling the character signal to be stored in the buffer memory 12 in real time. This assures reception of the data packets even when they are inserted in successive horizontal scanning lines.

Furthermore, the existence of a code error in the data packet is detected during the horizontal scanning period in which the data packet is inserted, and the detection data is added to the data packet to be stored in the buffer memory. Accordingly, the CPU 13 can judge the existence of an error in the data packet by only retrieving the N bit data at a special address of the buffer memory 12. This makes it possible to decode the code immediately when no code error exists, and enhances the efficiency in decoding to a great extent especially in a case where the receiving condition is good and no code error exists.

Furthermore, it is not necessary to conduct an error correcton of a non-essential data packet even in a case where an error exists, and such a data packet can be abandoned. That is, data packets of the same program number are transmitted during horizontal scanning lines of the same scanning line number, and one of them becomes unnecessary. Thus, the data packet of the program which is not selected by a viewer can be abandoned. Accordingly, even if the receiving condition is bad and a code error is likely to occur, only an essential data packet has to be corrected, resulting in an increased efficiency of the error correction and the decoding.

As described above, according to a code transmission system character broadcasting receiver of the present invention, the detection of a code error in the character signal is conducted in real time at the same time as the extraction of the character signal from the video signal, and the detection data is added to the extracted character signal to be stored in the buffer memory, and in decoding the character signal in the buffer memory an essential character signal including an error is subjected to an error correction based on the detection data.

This construction makes it possible to receive the character signals even when they are inserted in successive horizontal scanning periods as well as to judge the existence of a code error in each character signal by only retrieving the detection data. This construction, furthermore, makes it possible to handle essential character signals at a high efficiency.

What is claimed is:

1. A receiver for a code transmission system broadcast signal transmitted during the vertical blanking period of a television video signal, comprising:

means for extracting a character signal inserted in the video signal;

means for detecting the existence of a code error in the character signal simultaneously with the extraction of said character signal, and outputting a detection signal corresponding thereto;

buffer memory means for temporarily storing the character signal and detection signal corresponding thereto; and correction means, responsive to said detection signal, for correcting the code error in said character signal stored in said buffer memory means.

2. The receiver of claim 1, wherein said character signal comprises an information data part and a check code part, said correction means correcting a code error in said character signal based upon the contents of the check code part.

* * * * *